(12) United States Patent
Garimella et al.

(10) Patent No.: US 9,886,948 B1
(45) Date of Patent: Feb. 6, 2018

(54) NEURAL NETWORK PROCESSING OF MULTIPLE FEATURE STREAMS USING MAX POOLING AND RESTRICTED CONNECTIVITY

(71) Applicant: Amazon Technologies, Inc., Seattle, WA (US)

(72) Inventors: Sri Venkata Surya Siva Rama Krishna Garimella, Visakhapatnam (IN); Bjorn Hoffmeister, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 218 days.

(21) Appl. No.: 14/589,631

(22) Filed: Jan. 5, 2015

(51) Int. Cl.
| | |
|---|---|
| *G10L 15/16* | (2006.01) |
| *G10L 15/02* | (2006.01) |
| *G10L 15/00* | (2013.01) |
| *G10L 21/02* | (2013.01) |
| *G10L 15/14* | (2006.01) |
| *G10L 15/18* | (2013.01) |
| *G10L 21/0208* | (2013.01) |

(52) U.S. Cl.
CPC .............. *G10L 15/16* (2013.01); *G10L 15/00* (2013.01); *G10L 15/02* (2013.01); *G10L 15/14* (2013.01); *G10L 15/18* (2013.01); *G10L 21/02* (2013.01); *G10L 21/0208* (2013.01)

(58) Field of Classification Search
None
See application file for complete search history.

(56) References Cited

U.S. PATENT DOCUMENTS

| | | | | | |
|---|---|---|---|---|---|
| 6,804,643 | B1* | 10/2004 | Kiss | ........................ | G10L 15/02 704/234 |
| 7,035,797 | B2* | 4/2006 | Iso-Sipila | ............... | G10L 15/02 704/227 |
| 8,838,446 | B2* | 9/2014 | Jeong | ...................... | G10L 15/02 704/202 |
| 2003/0204398 | A1* | 10/2003 | Haverinen | .............. | G10L 15/20 704/233 |
| 2013/0297299 | A1* | 11/2013 | Chakrabartty | .......... | G10L 15/02 704/211 |
| 2015/0100312 | A1* | 4/2015 | Bocchieri | ............... | G10L 25/24 704/232 |
| 2015/0161987 | A1* | 6/2015 | Horesh | ................... | G10L 15/16 704/232 |
| 2015/0310858 | A1* | 10/2015 | Li | .......................... | G10L 15/16 704/232 |

* cited by examiner

*Primary Examiner* — Richard Zhu
(74) *Attorney, Agent, or Firm* — Knobbe, Martens, Olson & Bear, LLP (57) ABSTRACT

Features are disclosed for improving the robustness of a neural network by using multiple (e.g., two or more) feature streams, combing data from the feature streams, and comparing the combined data to data from a subset of the feature streams (e.g., comparing values from the combined feature stream to values from one of the component feature streams of the combined feature stream). The neural network can include a component or layer that selects the data with the highest value, which can suppress or exclude some or all corrupted data from the combined feature stream. Subsequent layers of the neural network can restrict connections from the combined feature stream to a component feature stream to reduce the possibility that a corrupted combined feature stream will corrupt the component feature stream.

20 Claims, 5 Drawing Sheets

NEURAL NETWORK PROCESSING OF MULTIPLE FEATURE STREAMS USING MAX POOLING AND RESTRICTED CONNECTIVITY

BACKGROUND

Computing devices can use models representing data relationships and patterns, such as functions, algorithms, systems, and the like, to process input (sometimes referred to as an input vector), and produce output (sometimes referred to as an output vector) that corresponds to the input in some way. In some implementations, a model is used to generate a likelihood or set of likelihoods that the input corresponds to a particular value. For example, artificial neural networks ("NNs"), including deep neural networks ("DNNs"), may be used to model speech (e.g., a NN-based acoustic model).

NNs generate scores, such as acoustic scores, by doing a forward pass. The forward pass involves progressing through the layers of the NN by multiplying large trained NN weight matrices, representing the parameters of the model, with vectors corresponding to input feature vectors or intermediate layer representations. The NN output can be used to determine which subword unit (e.g., phoneme, phoneme portion, or triphone) is most likely to correspond to an input feature vector.

Some NNs, such as convolutional neural networks, use a technique referred to as "max pooling" in which multiple values are generated at a given layer, and the maximum values are forwarded to the next layer. For example, a weight matrix of a lower dimension than the vector being processed may be applied to the vector using a sliding window technique in which the matrix is repeatedly applied to different portions of the vector. Individual values of the vector are multiplied using two or more different portions of the weight matrix, thus generating multiple candidate values for each dimension of the vector from which the best (e.g., maximum) value can be passed to the next layer.

BRIEF DESCRIPTION OF DRAWINGS

Embodiments of various inventive features will now be described with reference to the following drawings. Throughout the drawings, reference numbers may be re-used to indicate correspondence between referenced elements. The drawings are provided to illustrate example embodiments described herein and are not intended to limit the scope of the disclosure.

DETAILED DESCRIPTION

The present disclosure is directed to reducing the effect of corrupt, invalid, erroneous, inapplicable, or otherwise undesirable data during machine learning processing, such as processing performed using an artificial neural network. Input data, such as feature vectors, may be obtained in the form of multiple "feature streams," such as different groups of feature vectors extracted from a signal using different methods, different groups of feature vectors extracted from different signals, etc. Certain feature streams may be more likely to be corrupted than other feature streams. For example, a first feature stream may be more likely to be corrupted than a second feature stream. Data from the first feature stream, which may both positive and negative values, can be combined with data from the second feature stream, which may have both positive and negative values, to form a combined feature stream. When data from the combined feature stream meets a threshold or is otherwise determined to be satisfactory (e.g., the combined data has a value that is greater than or equal to data from the second feature stream alone), the data from the combined feature stream can be passed to subsequent layers of the neural network. However, in some cases the data from the combined feature stream fails to meet the threshold or is otherwise determined to be unsatisfactory (e.g., the combined data has a value that is less than data from the second feature stream alone), indicating that the combined feature stream may be corrupted (or, more specifically, that the first feature stream may be corrupted, such as when its distribution is different from that of the training data). In such cases, data from the second feature stream (e.g., the feature stream that is less likely to be corrupted) can be passed to subsequent layers of the neural network instead of data from the combined feature stream. Neural networks configured in this way may be more robust due to a reduction in the amount of corrupt data passed and used in subsequent layers of the neural network.

Generally described, artificial neural networks such as deep neural networks ("DNNs") have multiple (e.g., two or more) layers of nodes, and nodes of adjacent layers may be connected to each other. Conceptually, the nodes may be thought of as calculating output values as a function of a plurality of different input values. Each connection between the various nodes of adjacent layers may be associated with a respective weight. When processing input data in the form of a vector (e.g., one or more feature vectors containing information extracted from portions of the audio data), a neural network may multiply each input vector by a matrix representing the weights associated with connections between the input layer and the next layer, and then repeat the process for each subsequent layer of the neural network. For example, a neural network used in automatic speech recognition ("ASR") may contain several layers, including an input layer, an output layer, and any number of intermediate or "hidden" layers. Acoustic scores may be obtained by doing a forward pass. The forward pass involves multiplying the large weight matrices representing the connection weights between nodes of adjacent layers by vectors corresponding to one or more feature vectors (from the input layer) or hidden representations (from the subsequent hidden layers). If some portion of the input data is corrupt, invalid, erroneous, inapplicable, or otherwise undesirable, conventional neural networks may nevertheless proceed to apply the weight matrices to the input and pass the results from one layer to the next, increasing the likelihood of producing inaccurate results. Accordingly, such conventional neural networks lack the robustness to produce accurate or otherwise satisfactory results when some portion of the input data is corrupt.

Some aspects of the present disclosure are directed to a neural network that selectively excludes or suppresses data from feature streams that may be corrupted. Input data, such as feature vectors extracted from audio input of a user utterance, may include multiple separate feature streams. The feature streams may be separate in the sense that they were generated from the same audio signal using different techniques (e.g., log filter bank energy or "LFBE" feature vectors, i-vector feature vectors, etc.). A neural network may produce more accurate results when using a combination of data from each of the individual feature streams than when using data from only a subset of the feature streams, so long as the data is not corrupt. To enhance robustness and maintain a desired level of accuracy when data from certain feature streams is corrupt, invalid, erroneous, or otherwise undesirable, the neural network may be configured to reduce or eliminate the undesirable data by proceeding without a combination of data from all of the separate feature streams. For example, the neural network may be trained to process the data from a particular feature stream such that it will have a higher value when it is uncorrupted than when it is corrupted. The neural network may then compare data from a combined feature stream that includes the particular feature stream processed above to data from a feature stream that excludes the particular feature stream processed above. The neural network may pass only the maximum value of the compared feature streams to subsequent layers of the neural network. Thus, the neural network can reduce the effect of corrupted data on the combined feature stream by only passing data from the combined feature stream when it is more desirable (e.g., has a higher value) than data that excludes the particular feature stream processed as described above.

Additional aspects of the present disclosure relate to the separation of the individual data streams (or subsets thereof) within the neural network through restricted connectivity between nodes that correspond to the various data streams. Conventional neural networks typically apply weight matrices between layers such that each node is connected to (e.g., provides some basis for the value of) each node of a subsequent layer. In some embodiments, nodes corresponding to feature streams relatively less likely to be corrupted may be separated such that output from nodes corresponding to feature streams relatively more likely to be corrupted, or to combined feature streams, do not connect to the nodes of the feature streams relatively less likely to be corrupted. In this way, the integrity of the feature streams relatively less likely to be corrupted can be maintained. However, some nodes corresponding to feature streams relatively less likely to be corrupted may nevertheless be connected to nodes, in subsequent layers, corresponding to feature streams relatively more likely to be corrupted or to combined feature streams. In this way, partial connectivity between nodes can be implemented and the neural network may use a combination of data from each available feature stream when it is desirable to do so.

Although the examples and embodiments described herein will focus, for the purpose of illustration, on using max pooling and restricted connectivity between two feature streams in an ASR system, one skilled in the art will appreciate that the techniques described herein may be applied to other processes, methods, or systems. For example, the techniques are not limited to use with only two feature streams, but may in some embodiments be used with three or more individual feature streams, any one or more of which may be relatively more likely to be corrupted than any one or more of the others. As another example, the techniques are not limited to use in speech recognition, but may in some embodiments be used to solve other computation tasks, such as face detection, image recognition, handwriting recognition, etc. Various aspects of the disclosure will now be described with regard to certain examples and embodiments, which are intended to illustrate but not limit the disclosure.

Sample Speech Processing System

Figure 1:
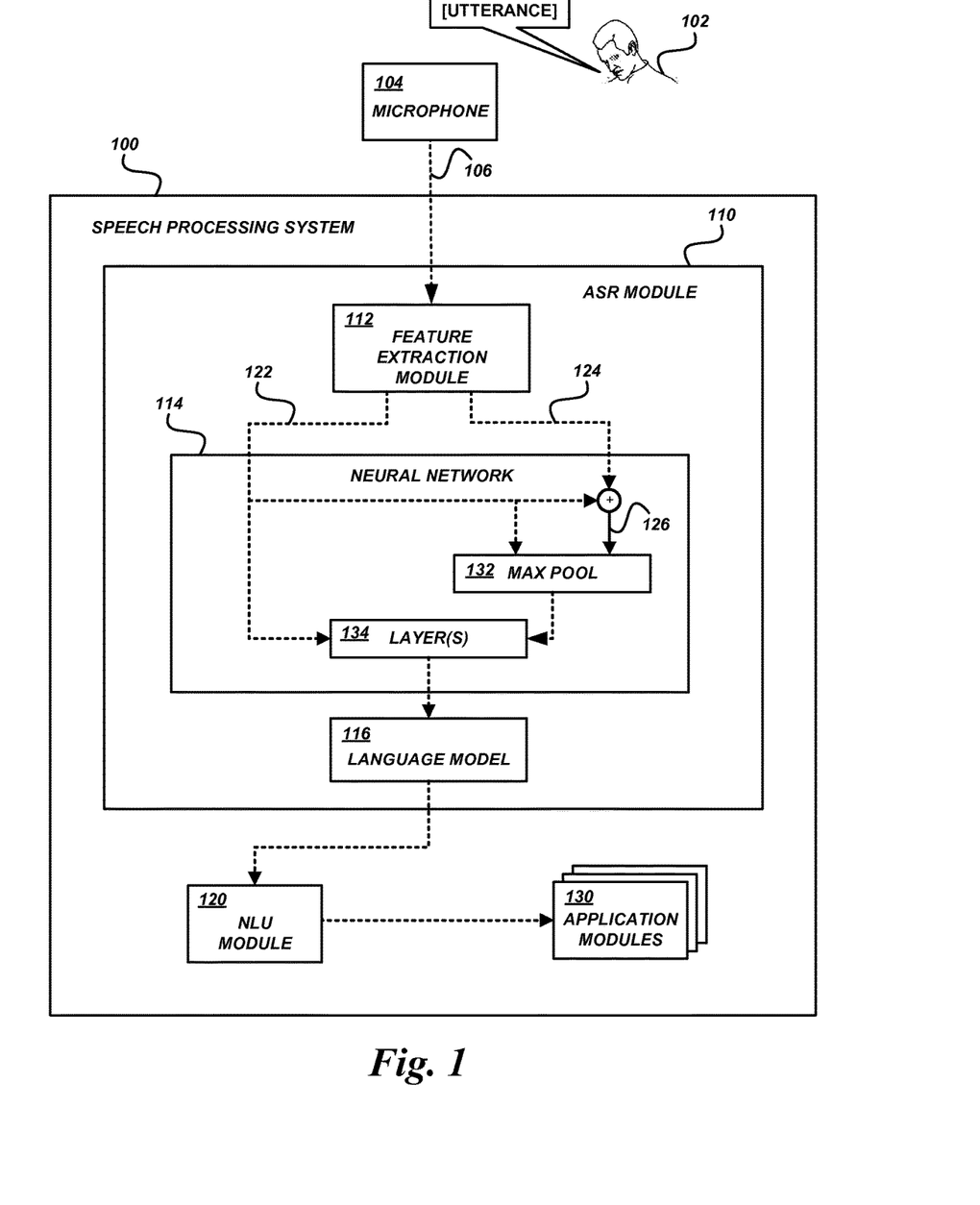
FIG. 1 is a block diagram of an illustrative spoken language processing system using a neural network with max pooling and restricted connectivity according to some embodiments.

With reference to an illustrative embodiment, FIG. 1 depicts a speech processing system 100 configured to perform speech recognition on an audio signal using a neural network 114. The neural network 114 may take input from multiple (e.g., two or more) feature streams, and may process the input using max pooling and restricted connectivity, as described in greater detail below. Such a neural network 114 can reduce the effect of a corrupt feature stream on ASR processing, and therefore may be more robust than conventional neural networks.

As shown, the speech processing system 100 may receive an audio signal 106 generated by a microphone 104 (or multiple microphones). The microphone 104 may be a stand-alone microphone in communication with the speech processing system 100. In some embodiments, the microphone 104 may be coupled to or integrated with a wide variety of computing devices, including personal computing devices, terminal computing devices, laptop computing devices, tablet computing devices, electronic reader devices, mobile devices (e.g., mobile phones, media players, handheld gaming devices, etc.), wearable devices with network access and program execution capabilities (e.g., "smart watches" or "smart eyewear"), wireless devices, set-top boxes, gaming consoles, entertainment systems, televisions with network access and program execution capabilities (e.g., "smart TVs"), and various other electronic devices and appliances.

The speech processing system 100 can process the audio signal 106 and perform various computing tasks using an ASR module 110, a natural language understanding ("NLU") module 120, various application modules 130, and the like. For example, the audio signal 106 may include audio of an utterance made by a user 102, and the speech processing system 100 may use the ASR module 110 to generate a transcription of the utterance. The speech processing system 100 may then use the NLU module 120 to determine the user's intent and select an action to take in response to the utterance. The speech processing system 100 may then use an application module 130 to carry out the selected action. The example modules and components shown in FIG. 1 are illustrative only, and are not intended to be limiting. In some embodiments, the speech processing system 100 may include additional, fewer, and/or alternative modules or components.

In one non-limiting example, the ASR module 110 may use a feature extraction module 112 to extract two feature streams 122 and 124 from the audio signal. The feature streams may correspond to streams of feature vectors that describe the input signal in a statistical manner. For example, 25 millisecond windows or "frames" of the input audio signal 106 (or data derived from the audio signal 106) extracted for each 10 millisecond shift may be processed by the feature extraction module 112 to generate a feature vector that includes statistics describing the frame. The feature streams 122 and 124 may therefore each include a series of feature vectors corresponding to a sequence of 25 millisecond frames of the input signal.

The extracted feature streams shown in FIG. 1 may correspond to streams from different channels, different microphones, etc. As one example, the extracted feature streams shown in FIG. 1 may correspond to a stream 122 of LFBE feature vectors and a stream 124 of i-vector feature vectors. Illustratively, feature vectors in stream 122 may be LFBE feature vectors of a current or most recent utterance, and may be extracted from an audio signal and provided to a neural network 114 in a real time or substantially real time manner to perform speech recognition. Feature vectors in stream 124 may be i-vector feature vectors of a prior utterance, or feature vectors from an earlier portion of the current utterance than the feature vectors of feature stream 122. The feature vectors of feature stream 124 may be useful in modifying a speech model (also referred to as "adapting" a speech model) to use the acoustic characteristics associated with the human speaker of the utterance. Using models adapted in this way can increase accuracy relative to general or un-adapted models. The feature vectors of stream 124 may be extracted from an audio signal and provided to the neural network 114 for processing in connection with a subsequent utterance (or subsequent time frame of the current utterance). In some cases, however, a new speaker may make the subsequent utterance, and speech of the new speaker may have significantly different acoustic characteristics than the previous speaker (e.g., one speaker may be a male and the other female; one speaker may be American and the other British; etc.). Adapting speech recognition models based on the acoustic characteristics of a different speaker than the speaker of the utterance currently being recognized may reduce accuracy in comparison with a general or un-adapted model, rather than increasing accuracy. Thus, a neural network 114 that can exclude or suppress data from the feature stream 124 that does not apply to the speaker of the utterance currently being processed may produce more accurate results than a conventional neural network that is not configured to exclude or suppress such data.

As another example, a system (such as a gaming system, teleconferencing system, etc.) may receive audio signals (or data derived therefrom) via multiple microphones, such as a first microphone mounted on a headset and a second microphone mounted on a fixed device (e.g., a computer monitor). As a person walks around a room, the position of the microphone on the person's headset relative to the person's mouth is fixed, whereas that the position of the microphone on the computer monitor relative to the person's mouth is constantly changing. In this scenario, LFBE features or audio from the microphone mounted to the computer monitor may contain undesired noise compared to that of the microphone mounted on a headset.

As shown in FIG. 1, the neural network 114 may include a max pooling component 132 that suppresses or excludes certain corrupt, invalid, erroneous, or otherwise undesirable data, such as data from feature stream 124 regarding a speaker other than the speaker of the utterance currently being processed. The neural network 114 may accept data from both feature streams 122 and 124, and may combine data from the two streams to form combined stream 126. For example, data from streams 122 and 124 may be summed to produce combined stream 126. The max pool component 132 may then compare data of (or derived from) stream 122 to data of (or derived from) stream 126. The max pooling component 132 can selectively pass the data with a higher value to the remaining layers 134 of the neural network 114, as described in greater detail below. Illustratively, the data from combined stream 126 may have a lower value that data from stream 122 more often when stream 124 is corrupted than when stream 124 is not corrupted. Accordingly, the max pooling component 132 may suppress or exclude data from combined stream 126 more often when stream 124 is corrupted than when stream 124 is not corrupted. In this way, the neural network 114 may be more robust than conventional neural networks which do not suppress or exclude corrupted data.

The ASR module 110 can further process output from the neural network to determine a word or subword unit for a portion of audio input. The ASR module 110 can then process a set of words or subword units (such as a lattice or n-best list of candidate transcriptions) using a language model 116 to generate speech recognition results, such as a most likely transcription of the utterance in the audio signal. The speech processing system 100 can then process the speech recognition results with the NLU module 120 to identify a likely user intent and/or an actionable command, execute the command using an application module 130, etc.

The speech processing system 100 may be implemented on a server computing device, such as the network-accessible server device shown in FIG. 5 and described in greater detail below. Audio data captured by a remote microphone 104 (e.g., a microphone coupled to or integrated with a mobile phone, tablet computer, notebook computer, desktop computer, set-top box, television, home stereo, or the like) may be transmitted to the speech processing system 100 via a network, such as a local area network ("LAN"), wide area network ("WAN"), cellular network, the Internet, etc. One or more server computing devices of the speech processing system 100 may then process the audio data using a neural network, as described in greater detail below.

In some embodiments, the speech processing system 100 may be a single server computing device, or it may include multiple distinct server computing devices, logically or physically grouped together to collectively operate as a speech processing system 100. The modules and components of the speech processing system 100 can each be implemented as hardware or as a combination of hardware and software. In addition, the modules and components of the speech processing system 100 can be combined on one server computing device or separated individually or into groups on several server computing devices. In some embodiments, the features and services provided by the speech processing system 100 may be implemented as web services consumable via a communication network. In further embodiments, the speech processing system 100 is provided by one more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment.

In some embodiments, the speech processing system 100 may be coupled to or integrated with the microphone 104. For example, the speech processing system 100 features described herein may be provided by a personal computing device, mobile computing device, consumer computing device, etc. In such cases, the audio signal does not need to (but may still) be transmitted to the speech processing system 100 via a network.

Example Process for Improving Neural Network Robustness

Figure 2:
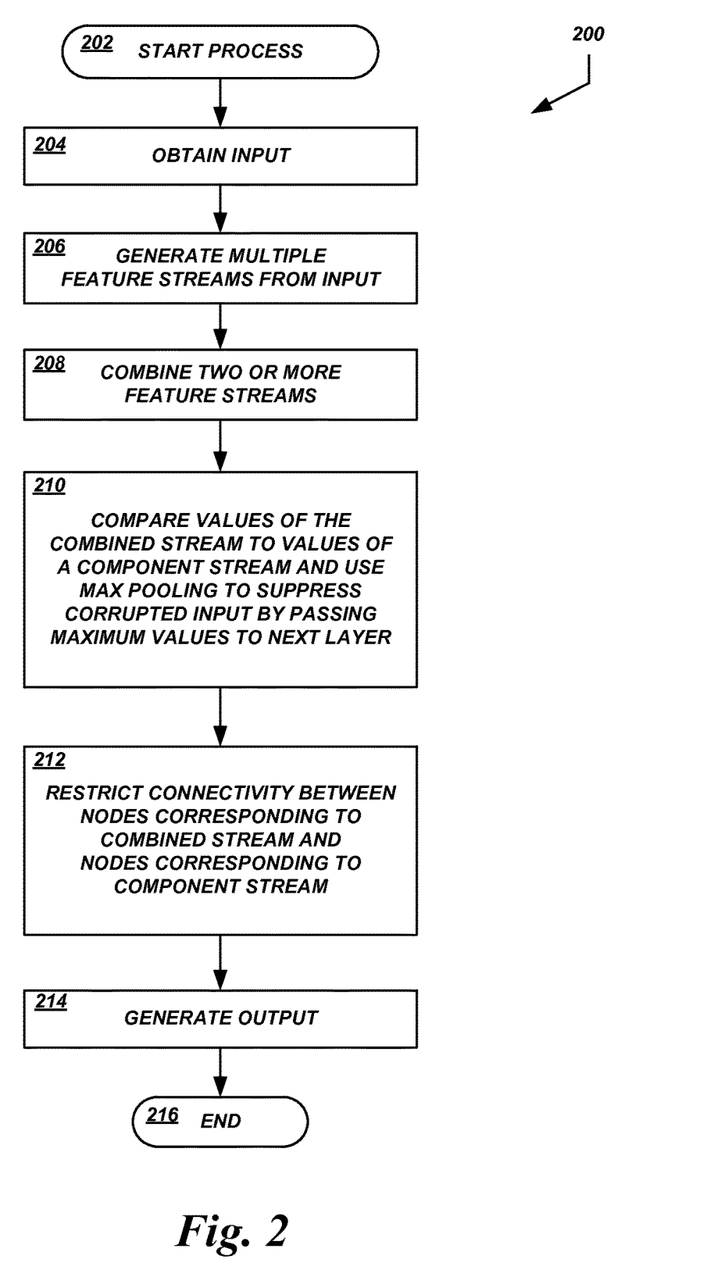
FIG. 2 is a flow diagram of an illustrative process for using a neural network with max pooling and restricted connectivity according to some embodiments.

FIG. 2 illustrates an example process for improving neural network robustness using max pooling and restricted connectivity among hidden nodes. Advantageously, a speech processing system 100 may use the process 200 with a neural network 114 to reduce the effect of corrupt, invalid, erroneous, inapplicable, or otherwise undesirable data when processing an audio signal. Such data will be referred to simply as "corrupted data" for convenience.

The process 200 shown in FIG. 2 begins at block 202. The process 200 may be embodied in a set of executable program instructions stored on a computer-readable medium, such as one or more disk drives, of a computing system, such as a server computing device 500 of the speech processing system 100, as shown in FIG. 5. When the process 200 is initiated, the executable program instructions can be loaded into memory, such as RAM, and executed by one or more processors of the computing system.

At block 204, the system executing the process 200 can receive input, such as audio input of a user utterance, as shown in FIG. 1.

Figure 3:
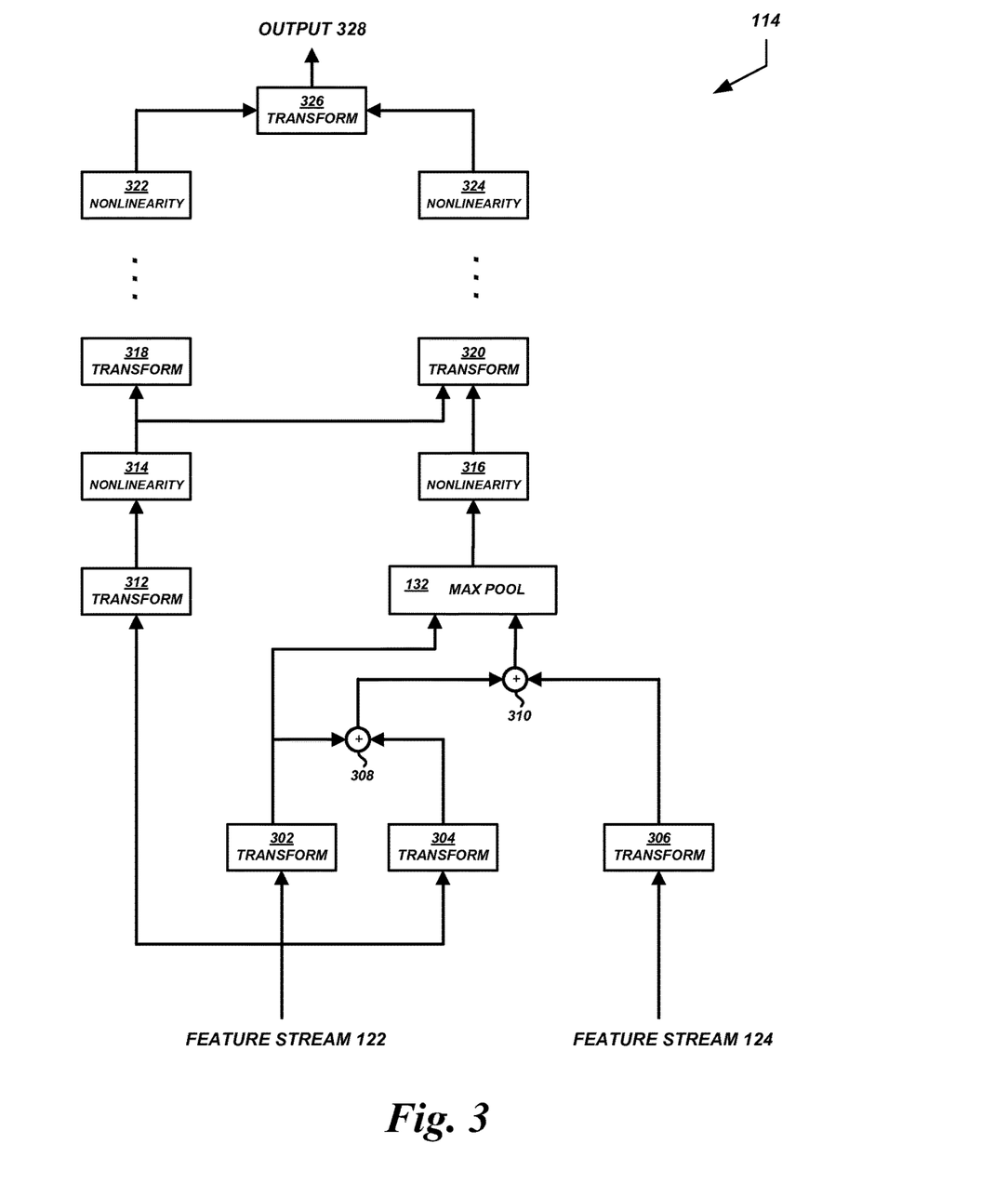
FIG. 3 is a block diagram of an illustrative neural network according to some embodiments.

At block 206, the system executing the process 200 can generate multiple feature streams from the audio input. The feature streams can be provided as input to a neural network 114, such as the neural network 114 shown in FIG. 1 and FIG. 3. As shown in FIG. 3, two different feature streams 122 and 124 may be generated and input into the neural network 114. However, the example illustrated in FIG. 3 is illustrative only, and is not intended to be limiting. In some embodiments, three, four, or more feature streams may be extracted from a single input signal and provided to a single neural network 114, and additional max pooling components may be used (e.g., two max pooling components may be used when there are three feature streams, three max pooling components may be used when there are four feature streams, etc.). In some embodiments, the process 200 may be performed with feature streams extracted from, or generated using, two or more different signals rather than a single signal.

As shown in FIG. 3, the input feature streams 122, 124 can be processed through the layers of the neural network 114 in a forward pass. The forward pass for a given feature vector from each stream may be begin with transformations that alter the dimensionality of the feature vectors. For example, feature vectors from stream 122 may be 220-dimension feature vectors (e.g., feature vectors with 220 values), and feature vectors from stream 124 may be 32-dimension feature vectors (e.g., feature vectors with 32 values).

A feature vector from stream 122 may be transformed by transform component 302 into a 256-dimension vector. The same feature vector may be transformed by transform component 304 into another 256-dimension vector. The same feature vector may be transformed in multiple different ways to produce output that can be combined with transformed output from other feature streams, compared to the combined output, etc. For example, transform component 302 may be configured to apply an affine transformation to the feature vector to produce a linear output, and transform component 304 may be configured to apply a different affine transformation to the feature vector, such as setting each of the 256 values to zero or some low non-zero value. The output of the two transforms 302 and 304 can be summed at sum component 308. Due to the output of transform component 304 being zero or near-zero, the output of summing component 308 may approximate the output of transform component 302 alone.

Illustratively, transform component 304 may be initially set to produce zero or near-zero output at the beginning of a training process, such as when the rest of the neural network is initialized. The neural network may be initially trained on input from only one feature stream and without using a max-pool component. Then, a second feature stream can be added as input, and transform component 306 can be trained such that it tends to produce positive output for feature vectors from the second feature stream that are useful in producing accurate neural network output, and to produce negative values for feature vectors from the second feature stream that are not useful in producing accurate neural network output. In addition, transform component 304 can be trained to aid in the production of higher values for combined feature vectors (relative to feature vectors from only the first feature stream) when feature vectors from the second feature stream are useful in producing accurate neural network output, and to produce lower values for combined feature vectors (relative to feature vectors from only the first feature stream) when feature vectors from the second feature stream are not useful in producing accurate neural network output.

In some embodiments, the transform component 304 may be initialized to produce near-zero output due to the rest of the neural network being initialized using a network-trained first feature stream (e.g., trained transform component 302). In such cases, transform component 306 may be initialized randomly. Thus, each node of max pool component 132 will forward either a value from a node of transform component 302 or a value from a node of transform component 302 combined with a value from a node of transform component 306 (e.g., when second feature steam 124 produces a positive output for a node of transform 306). Once transform component 306 is trained using a second feature stream 124, transform component 304 can provide flexibility to adjust the first feature stream 122 to be combined with the second feature stream (e.g., the output of transform component 306) without requiring input from the first feature stream 122 to max pool component 132 (e.g., the output of transform component 302) to be the same.

A feature vector from stream 124 may be transformed by transform component 306 (or multiple transform components), such as a transform component configured to transform feature vectors using a non-linear feature transform or series of non-linear feature transforms. Such transforms can produce both positive and negative values. For example, the feature vector from stream 124 may be transformed by a non-linear feature transform component into a 256-dimesion transformed i-vector. The output of transform component 306 may be an i-vector with both positive and negative values, and a mean of about zero.

At block 208, the neural network 114 can combine feature streams 122 and 124 to generate a combined stream 126. The various feature streams combined to form combined stream 126 may be referred to as component feature streams (e.g., the streams are individual components of the combined feature stream). Thus, combined stream 126 has component feature streams 122 and 124.

As shown in FIG. 3, the output of summing component 308 can be combined at summing component 310 with the output of transform component 306. In other words, a transformed feature vector from stream 122 may be combined with a transformed feature vector from stream 124 at summing component 310.

At block 210, the max pool component 132 of the neural network 114 can reduce or eliminate corrupted data from certain feature streams from passing to subsequent layers of the neural network 114. The max pool component 132 may do so by comparing values of a combined stream to values of one or more of its component streams (e.g., comparing values from summing component 310, corresponding to the combination of transformed feature vectors from both component streams 122 and 124, to the output of transform component 302, corresponding to the transformed feature vector from stream 122). The feature vectors compared by the max pool component 132 may each have the same size (e.g., the same number of dimensions), and the max pool component 132 can compare the feature vectors on a dimension-by-dimension basis, passing the higher value for each dimension to subsequent layers of the neural network 114 as output. In some embodiments, the output from the max pool component 132 may be of the same dimension as each of the inputs, and may include a combination of values from each of the inputs or only values from one of the inputs.

Illustratively, non-corrupted data from feature stream 124 tends to have a positive value after being transformed by transform component 306. Because the transformed feature vector from stream 124 is added to the transformed feature vector from stream 122 and subsequently compared by the max pool component 132 to the same (or about the same) transformed feature vector from stream 122, the combined output of summing component 310 will have a higher value than the transformed feature vector from stream 122 alone. Thus, the max pool component 132 will tend to pass non-corrupted data from the combined feature stream (e.g., the combined output of summing component 310) to subsequent layers of the neural network 114.

Corrupted data from feature stream 124 may have a positive or negative value after being transformed by transform component 306. Because the transformed feature vector from stream 124 is added to the transformed feature vector from stream 122 and subsequently compared by the max pool component 132 to the same (or about the same) transformed feature vector from stream 122, the combined output of summing component 310 will have either a higher or lower value than the transformed feature vector from stream 122 alone. Thus, the max pool component 132 will tend to exclude or suppress at least a portion of the data from the combined feature stream (e.g., the combined output of summing component 310) to subsequent layers of the neural network 114. Illustratively, the max pool component 132 may exclude or suppress about half of the corrupted values (if the values are about evenly distributed about the zero mean).

The neural network 114 may apply a nonlinearity function to the output of the max pool component 132, and to the output of any or all other components of any or all other layers. For example, nonlinearity component 316 may apply a sigmoid nonlinearity to the output of the max pool component 132, and provide the nonlinear output the next layer of the neural network (e.g., to transform component 320).

Returning to FIG. 2, at block 212 the neural network can restrict connectivity between nodes corresponding to the different feature streams. As described above, the nodes in a given layer of a conventional neural network are each connected to each node of a subsequent layer via application of the weight matrices. As shown in FIG. 3, output for feature stream 122 is provided as an input to the components on the feature stream 124 side of the neural network 114 (e.g., the output of transfer component 302 is provided to the max pool component 132; the output of nonlinearity component 314 is provided to transform component 320, etc.). However, the output from nonlinearity components on the on the feature stream 124/126 side of the neural network 114 are provided to fewer transform components on the feature stream 122 side of the neural network 114. In some embodiments, the output corresponding to features from stream 124/126 are not provided as input to any component on the feature stream 122 side of the neural network 114. Such restricted connectivity can preserve the uncorrupted state of data from feature stream 122, while still providing the benefits of combining feature streams 122 and 124 when feature stream 124 is not corrupted.

At block 214, the neural network 114 may complete the forward pass by processing the data from nonlinearity components 314, 316 of the layer described above (e.g., the layer in which the max pool component 132 selectively passes data from the combined feature steam 126 and one of its component feature streams 122). For example, the neural network may have any number of additional layers, and each layer may apply transforms (e.g., transforms 318 and 320) and nonlinearities (e.g., nonlinearities 322 and 324), etc. The output layer of the neural network may include transform component 326 that transforms data the data into an output vector (e.g. applies an affine transform to data from the feature stream 122 side of the neural network 114 and data from the feature stream 124/126 side of the neural network). The process 200 may be repeated for each set of input feature vectors from the feature streams 122 and 124, and may then terminate at block 216.

Example Process for Training Neural Network

Figure 4:
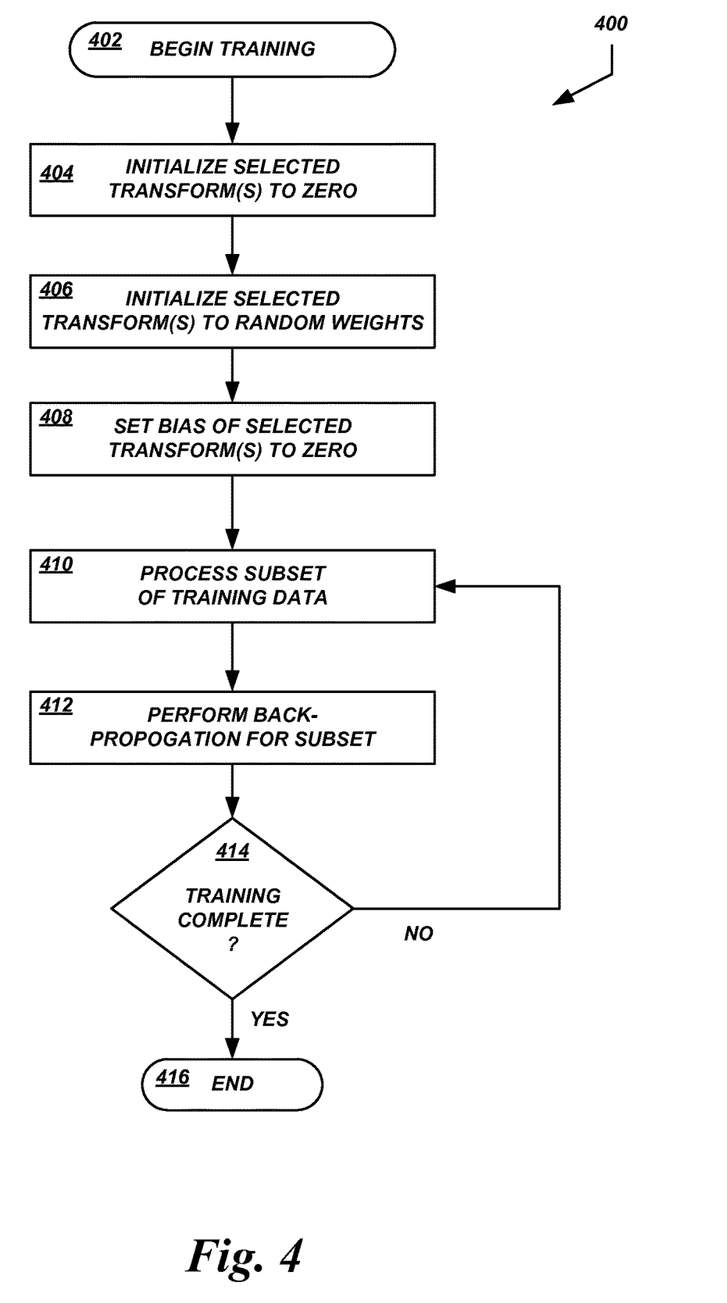
FIG. 4 is a flow diagram of an illustrative process for training a neural network according to some embodiments.

FIG. 4 illustrates an example process for initializing and training a neural network that implements max pooling and restricted connectivity. A speech processing system 100 may use the process 400 to initialize and train a neural network, such as the neural network 114.

The process 400 shown in FIG. 4 begins at block 402. The process 400 may be embodied in a set of executable program instructions stored on a computer-readable medium, such as one or more disk drives, of a computing system, such as a server computing device 500 of the speech processing system 100, as shown in FIG. 5. When the process 400 is initiated, the executable program instructions can be loaded into memory, such as RAM, and executed by one or more processors of the computing system.

At block 404, the system executing the process 400 can initialize selected transforms of the neural network 114 to zero. For example, transform component 304, which is used to transform data from feature stream 122 before it is combined with output from another transform component 302 that corresponds to another transformed instance of the data from the same feature stream 122, can be initially set to zero. Thus, when the output from the two transforms 304 and 302 is summed at summing component 308, the transformed output from transform component 302 is produced without modification. In some embodiments, the weights of transform component 304 may later be modified during the training process, such as during back propagation as described below. Thus, summing component 308 may not necessarily produce the transformed output from transform 302 without modification after the neural network 114 has been trained.

At block 406, the system executing the process 400 can initialize selected transforms of the neural network 114 to random weights. For example, the weights of transform component 306 and/or any other transform component may be initially set to random weights. The weights of the transforms may later be modified during the training process, such as during back propagation as described below, to improve the accuracy of the output from the neural network 114.

At block 408, the system executing the process 400 can set the bias of selected transforms to zero. For example, the bias of transform component 306 can be set to zero so that the transformed output includes both positive and negative numbers with a mean of zero (or close to zero). In this way, the output from summing component 310 that is provided to the max pool component 132 may in some cases be greater, and in some cases be less than, the output from transform component 302, corresponding to component stream 122.

At block 410, the system executing the process 400 can process training data using the initialized neural network 114. In some embodiments, the training data may be separated in to subsets, also referred to as "mini-batches," such that back-propagation can be performed more often (e.g., for each mini-batch) to update the weights of the transform components.

At block 412, the system executing the process 400 can perform back-propagation on the neural network 114. Generally described, back-propagation refers to the process of updating the weights for the individual layers to improve accuracy of the neural network. In some embodiments, back-propagation may be performed based on an objective function value. For example, back-propagation may be performed based on the results of processing the mini-batch of training data above, and may be performed to improve the objective function value and therefore improve the accuracy of the neural network when processing the mini-batch of training data.

At decision block 414, the system executing the process 400 can determine whether training is complete. If so, the process 400 may terminate at block 416. Otherwise, if training is not complete, the process 400 may return to block 410. In some embodiments, the determination of whether training is complete may be based on whether the objective function values are converging. In some embodiments, the process 400 may be performed for a predetermined or dynamically determined number of iterations.

In some embodiments, the neural network 114 may be first trained on data from only a first feature stream, such as feature stream 122 shown in FIG. 3. After various components of the neural network have been trained using the first feature stream, the neural network 114 may be trained using both the first feature stream and a second feature stream, such as feature stream 124 shown in FIG. 3. In this way, the neural network 114 can be trained to produce accurate output based on the first feature stream 122 alone, and further trained to use the second feature stream 124 in conjunction with the first feature stream 122 when doing so will improve accuracy relative to using only the first feature stream 122

Execution Environment

Figure 5:
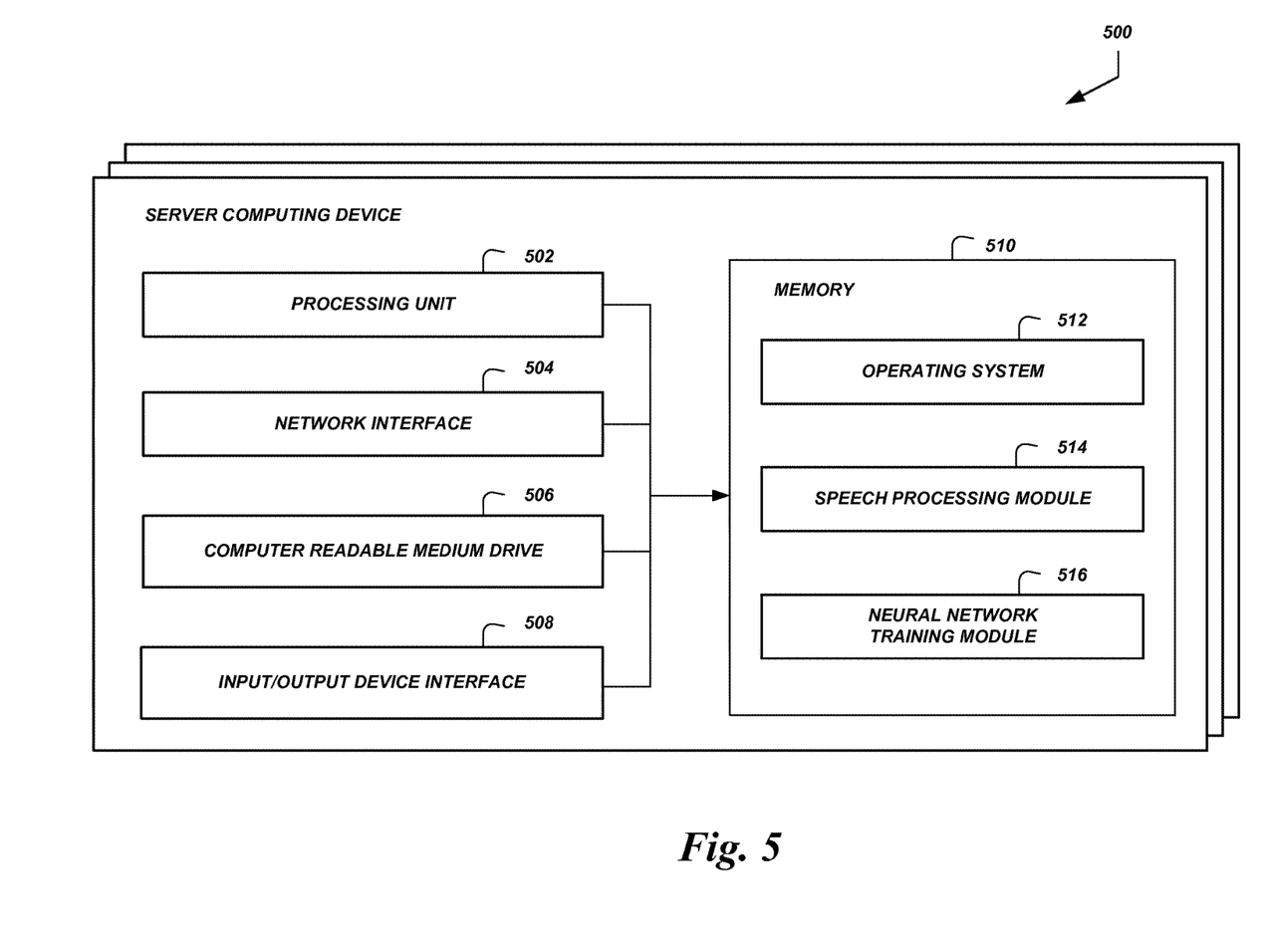
FIG. 5 is a block diagram of an illustrative computing system configured to train and/or use a neural network according to some embodiments.

FIG. 5 illustrates an example server computing device computing device 500 configured to execute the processes and implement the features described above will be described. The computing device 500 can be a server or other computing device, and can comprise a processing unit 502, a network interface 504, a computer readable medium drive 506, an input/output device interface 508, and a memory 510. The network interface 504 can provide connectivity to one or more networks or computing systems. The processing unit 504 can receive information and instructions from other computing systems or services via the network interface 504. The network interface 504 can also store data directly to memory 510. The processing unit 502 can communicate to and from memory 510, execute instructions and process data in memory 510, etc.

The memory 510 may include computer program instructions that the processing unit 502 executes in order to implement one or more embodiments. The memory 510 generally includes volatile memory, such as RAM, and/or other non-transitory computer-readable media. The memory 510 can store an operating system 512 that provides computer program instructions for use by the processing unit 502 in the general administration and operation of the computing device 500. The memory 510 can further include computer program instructions and other information for implementing aspects of the present disclosure. For example, in one embodiment, the memory 510 includes a speech processing module 514 that accepts input in the form of audio, and processes the input using a neural network 114, as described above with respect to process 200. Memory 510 may also include a neural network training module 516 that trains neural networks as described above with respect to process 400.

In some embodiments, the computing device 502 may include additional or fewer components than are shown in FIG. 5. For example, a computing device 502 may include more than one processing unit 502 and computer readable medium drive 506. In some embodiments, multiple (e.g., two or more) computing devices 500 may together form a computer system for executing features of the present disclosure. For example, multiple computing devices 500 may communicate with each other via their respective network interfaces 504, and can implement load balancing of multiple tasks (e.g., each computing device 500 may execute one or more separate instances of the processes 200 and/or 400), parallel processing (e.g., each computing device 500 may execute a portion of a single instance of a process 200 and/or 400), etc.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or as a combination of electronic hardware and executable software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A computer-implemented method comprising:
   under control of one or more computing devices configured with specific computer-executable instructions,
   obtaining audio data of an utterance;
   generating, using the audio data, a first feature stream comprising one or more feature vectors, wherein individual feature vectors of the first feature stream comprise statistical values computed for a corresponding portion of the audio data;
   generating, using the audio data, a second feature stream comprising one or more feature vectors, wherein individual feature vectors of the second feature stream comprise statistical values computed for a corresponding portion of the audio data;
   generating a first transformed vector using an affine transformation and a feature vector of the first feature stream;
   generating a second transformed vector using a non-linear feature transformation and a feature vector of the second feature stream;
   adding the first transformed vector to the second transformed vector to generate a combined vector;
   generating a maximum value vector by selecting, for at least one value of the maximum value vector, a maximum value from a set of values comprising a value of the first transformed vector and a corresponding value of the combined vector, wherein a lower corresponding value of the combined vector relative to the value of the first transformed vector is indicative of corrupted data in the combined vector;
   determining a phoneme that corresponds to a portion of the audio data, wherein if the first value is the maximum value, the phoneme is determined based at least partly on the first transformed vector, and wherein if the second value is the maximum value, the phoneme is determined based at least partly on the combined vector; and
   generating speech recognition results using the phoneme and a language model, wherein generating the speech recognition results comprises:
   generating a set of phonemes comprising the phoneme; and
   applying the language model to the set of phonemes to generate a likely transcription of the utterance.

2. The computer-implemented method of claim 1, wherein generating the maximum value vector comprises using a max pooling component of a neural network to compare individual values of the first transformed feature vector to corresponding values of the combined feature vector.

3. The computer-implemented method of claim 2, wherein the neural network comprises at least a first layer of nodes and a subsequent layer of nodes, wherein a node of the first layer comprises a value based at least partly on a feature vector from each of the first and second feature streams, and wherein a value of a node of the subsequent layer is not based on any feature vector from the second feature stream.

4. The computer-implemented method of claim 1, wherein the second transformed vector comprises a negative value indicative of corrupted data in the second feature stream, and wherein generating the maximum value vector comprises excluding a value, from the combined vector, generated using a negative value of the second transformed vector.

5. The computer-implemented method of claim 1, wherein generating the first feature stream comprises generating, using the audio data, log filter bank energy feature vectors to perform speech recognition on the utterance, and wherein generating the second feature stream comprises generating, using the audio data, i-vector-based feature vectors for a previous utterance to modify an acoustic model based on a characteristic of the previous utterance.

6. A system comprising:
a computer-readable memory storing executable instructions; and
one or more processors in communication with the computer-readable memory, wherein the one or more processors are programmed by the executable instructions to at least:
receive a first feature vector corresponding to a portion of an audio signal;
receive a second feature vector corresponding to a further portion of the audio signal;
compare at least a first value of the first feature vector to at least a second value of a combined vector, wherein the second value of the combined vector comprises a sum of the first value of the first feature vector and at least one corresponding value of the second feature vector;
generate a maximum value vector comprising a maximum value of the first value and the second value;
determine, using the maximum value vector, acoustic model output indicating a subword unit that corresponds to at least a portion of the audio signal, wherein if the first value is the maximum value, acoustic model output is determined using the first feature vector, and wherein if the second value is the maximum value, the acoustic model output is determined using the combined vector;
generate a set of subword units comprising the subword unit; and
apply a language model to the set of subword units to generate a likely transcription of an utterance represented by the audio signal.

7. The system of claim 6, wherein the executable instructions to determine the acoustic model output comprise executable instructions to use a neural network to process the maximum value vector and generate an acoustic score indicative of a correspondence between a portion of the audio signal and the subword unit.

8. The system of claim 6, wherein the one or more processors are further programmed to transform the first feature vector using a first transform.

9. The system of claim 8, wherein the one or more processors are further programmed to transform the second feature vector using a second transform, wherein the second transform is configured to produce values distributed about a zero mean.

10. The system of claim 9, wherein the one or more processors are further programmed to generate the combined vector based at least partly on the first feature vector and the second feature vector subsequent to the first feature vector being transformed and subsequent to the second feature vector being transformed.

11. The system of claim 10, wherein the one or more processors are configured to generate the maximum value vector using a max pooling component.

12. The system of claim 11, wherein the one or more processors are further programmed to:
obtain one or more additional feature vectors; and
use one or more additional max pooling components to generate the maximum value vector.

13. The system of claim 6, wherein the one or more processors are further programmed to obtain a third feature vector, and wherein the second value is based at least partly on the first feature vector, the second feature vector, and the third feature vector.

14. The system of claim 6, wherein the second feature vector comprises one or more values indicative of corrupted data, and wherein the one or more processors are programmed to generate the maximum value vector by excluding at least a portion of the one or more values indicative of corrupted data from the maximum value vector.

15. One or more non-transitory computer readable media comprising executable code that, when executed, cause one or more computing devices to perform a process comprising:
obtaining a first feature vector corresponding to a portion of an audio signal;
obtaining a second feature vector corresponding to a further portion of the audio signal;
comparing at least a first value of the first feature vector to at least a second value of a combined vector, wherein the combined vector comprises a sum of at least one value of the first feature vector and at least one corresponding value of the second feature vector;
generating a maximum value vector based at least partly on the comparing, wherein the maximum value vector comprises a maximum value of the first value and the second value;
determining, using the maximum value vector, acoustic model output indicating a subword unit that corresponds to at least a portion of the audio signal, wherein if the first value is the maximum value, the acoustic model output is determined using the first feature vector, and wherein if the second value is the maximum value, the acoustic model output is determined using the combined vector;
generating a set of subword units comprising the subword unit; and
applying a language model to the set of subword units to generate a likely transcription of an utterance represented by the audio signal.

16. The one or more non-transitory computer readable media of claim 15, wherein determining the acoustic model output comprises using neural network processing of the maximum value vector to generate an acoustic score indicative of a correspondence between a portion of the audio signal and the subword unit.

17. The one or more non-transitory computer readable media of claim 15, the process further comprising initializing each weight of a transform to zero, wherein the transform is used to transform the first feature vector into a transformed feature vector, and wherein the transformed feature vector is added to the first feature vector.

18. The one or more non-transitory computer readable media of claim 17, the process further comprising training the transform such that one or more weights of the transform are set to non-zero values.

19. The one or more non-transitory computer readable media of claim 15, the process further comprising generating the combined vector by adding at least one value of the first feature vector to at least one value of the second feature vector.

20. The one or more non-transitory computer readable media of claim 15, wherein generating the maximum value vector comprises using a neural network comprising a plurality of layers, the process further comprising:
- determining values of nodes, corresponding to the second feature stream vector, in a particular layer of the plurality of layers based at least partly on values of nodes, corresponding to the first feature stream vector, in a previous layer of the plurality of layers,
- wherein values of nodes corresponding to the first feature stream vector in the particular layer are not based on values of nodes corresponding to the second feature stream vector in the previous layer.

* * * * *

UNITED STATES PATENT AND TRADEMARK OFFICE
CERTIFICATE OF CORRECTION

PATENT NO. : 9,886,948 B1  
APPLICATION NO. : 14/589631  
DATED : February 6, 2018  
INVENTOR(S) : Sri Venkata Surya Siva Rama Kr Garimella Page 1 of 1

It is certified that error appears in the above-identified patent and that said Letters Patent is hereby corrected as shown below:

In the Claims

In Column 17 at Line 19, In Claim 20, after "feature" delete "stream".

In Column 17 at Line 21, In Claim 20, after "feature" delete "stream".

In Column 17 at Line 24, In Claim 20, before "vector" delete "steam".

In Column 17 at Line 26, In Claim 20, before "vector" delete "steam".

Signed and Sealed this  
Eighteenth Day of June, 2019

Andrei Iancu  
*Director of the United States Patent and Trademark Office*